(12) United States Patent
Speggiorin

(10) Patent No.: US 7,588,377 B2
(45) Date of Patent: Sep. 15, 2009

(54) RAPID-ORIENTATION HEAD FOR OPTICAL AND PHOTOGRAPHIC APPARATUS IN GENERAL

(75) Inventor: Paolo Speggiorin, Mussolente VI (IT)

(73) Assignee: Lino Manfrotto + Co. S.p.A., Bassano del Grappa VI (IT)

( * ) Notice: Subject to any disclaimer, the term of this patent is extended or adjusted under 35 U.S.C. 154(b) by 575 days.

(21) Appl. No.: 10/543,644

(22) PCT Filed: Jan. 22, 2004

(86) PCT No.: PCT/EP2004/000510

§ 371 (c)(1),
(2), (4) Date: May 9, 2006

(87) PCT Pub. No.: WO2004/068023

PCT Pub. Date: Aug. 12, 2004

(65) Prior Publication Data

US 2006/0269277 A1 Nov. 30, 2006

(30) Foreign Application Priority Data

Jan. 30, 2003 (IT) .......................... PD2003A0019

(51) Int. Cl.
*G03B 17/00* (2006.01)

(52) U.S. Cl. ..................................... 396/428; 396/422

(58) Field of Classification Search ................. 396/419, 396/422, 425, 428; 348/373, 376; 248/177.1, 248/178.1, 181.1, 183.1, 187.1; D16/242, D16/243, 245
See application file for complete search history.

(56) References Cited

U.S. PATENT DOCUMENTS

| 1,272,574 | A | | 7/1918 | Thomas |
|---|---|---|---|---|
| 3,893,144 | A | | 7/1975 | Funderburk |
| 4,097,883 | A | | 6/1978 | Adamski et al. |
| 4,795,118 | A | | 1/1989 | Tadashi et al. |
| 4,915,333 | A | | 4/1990 | Bolondi |
| D515,614 | S | * | 2/2006 | Speggiorin ............... D16/243 |
| D532,813 | S | * | 11/2006 | Speggiorin ............... D16/243 |
| 2008/0210832 | A1 | * | 9/2008 | Speggiorin ............... 248/183.1 |

FOREIGN PATENT DOCUMENTS

| GB | 618 296 | 2/1949 |
|---|---|---|
| GB | 912 577 | 12/1962 |

* cited by examiner

*Primary Examiner*—Rodney E Fuller
(74) *Attorney, Agent, or Firm*—RatnerPrestia

(57) ABSTRACT

A rapid-orientation head for optical and photographic apparatus in general includes a ball joint having a first attachment on one side, for attachment to a support, and having a handle on the other side, a second attachment on the handle for restraining the optical apparatus thereon, and a reversible lock for the ball joint which is mounted on the handle in order to permit the relative orientation between the first and second attachments. The handle extends transversely with respect to the direction joining the first and second attachment.

17 Claims, 4 Drawing Sheets

RAPID-ORIENTATION HEAD FOR OPTICAL AND PHOTOGRAPHIC APPARATUS IN GENERAL

This application is a U.S. National Phase Application of PCT International Application PCT/EP2004/000510.

TECHNICAL FIELD

The present invention relates to a rapid-orientation head for optical apparatus, in particular photographic apparatus, of the type including the features mentioned in the preamble of the main claim.

BACKGROUND ART

A head including those features is known from U.S. Pat. No. 4,915,333.

That head is particularly advantageous because it is provided with a ball-and-socket joint mechanism surmounted by a handle on which an attachment for the photographic equipment is in turn mounted. The ball joint is normally locked and capable of being unlocked by action on a lever belonging to the handle in such a manner that the photographic equipment can be rapidly and easily positioned even using one hand only, i.e. the one gripping the handle.

A disadvantage of this known head is that the structure so designed imposes a disadvantageous lever arm between the equipment and the ball joint and therefore the head does not lend itself well to the positioning of heavy structures. In addition, the operation of the lever causes the ball joint to pass from being completely locked to being completely unlocked, with the consequence that the equipment may be subjected to sudden oscillations and jolts.

DISCLOSURE OF THE INVENTION

The technical problem on which the present invention is based is to provide a head of the type indicated above which is designed structurally and functionally to overcome all of the disadvantages discussed with reference to the mentioned prior art.

This problem is solved by the invention with a rapid-orientation head produced in accordance with the claims which follow.

BRIEF DESCRIPTION OF THE DRAWINGS

The features and advantages of the invention will emerge more clearly from the detailed description of a preferred embodiment thereof which is illustrated by way of non-limiting example with reference to the appended drawings in which.

BEST MODE FOR CARRYING OUT THE INVENTION

Figure 1:
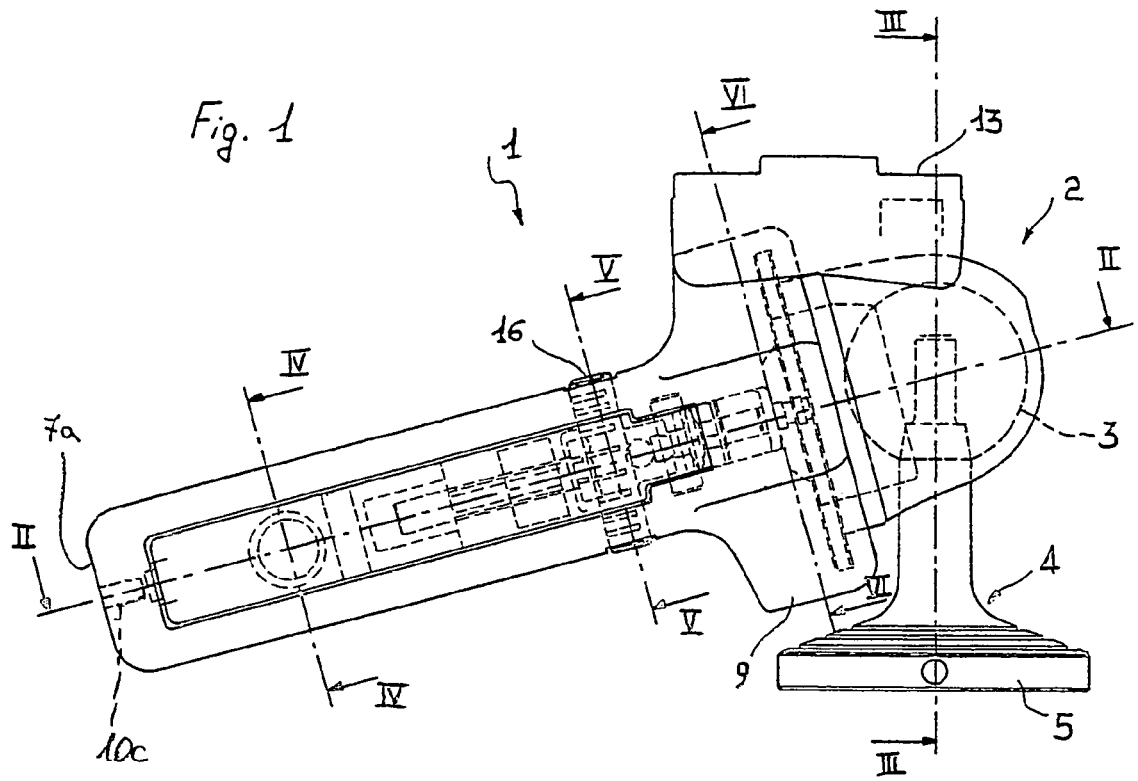
FIG. 1 is a front view of a rapid-orientation head according to the invention.
Figure 2:
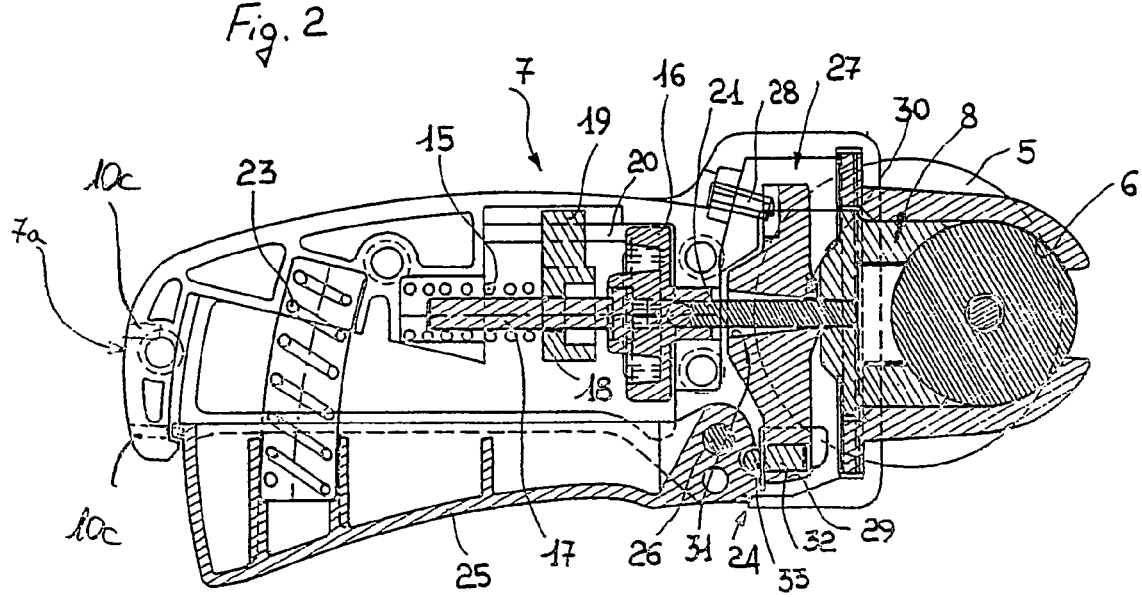
FIGS. 2 to 6 are sectioned views according to the lines II-II, III-III, IV-IV, V-V and VI-VI of FIG. 1.
Figure 3:
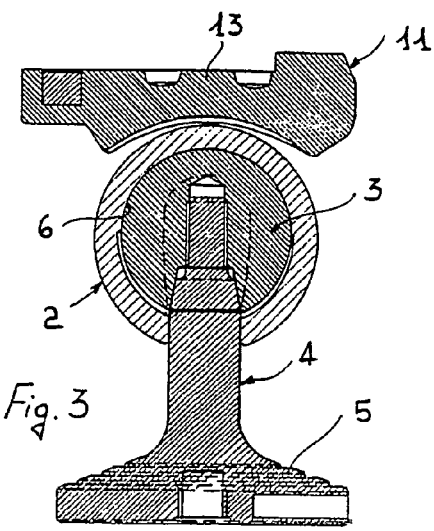
Figure 4:
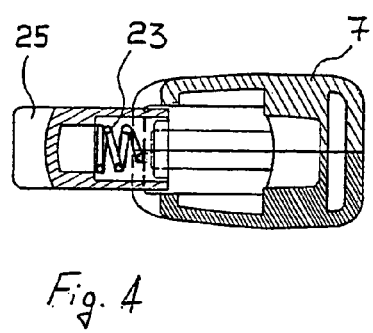
Figure 6:
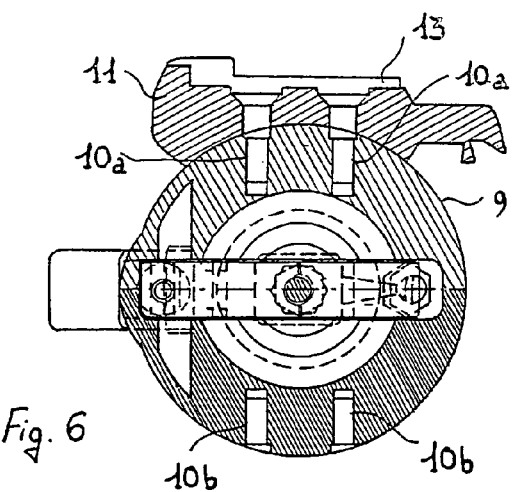
Figure 5:
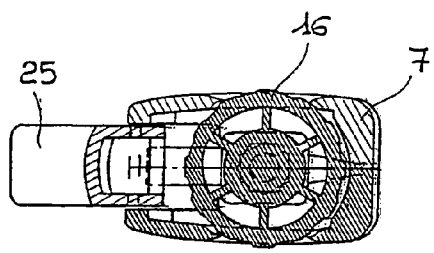
Figure 7:
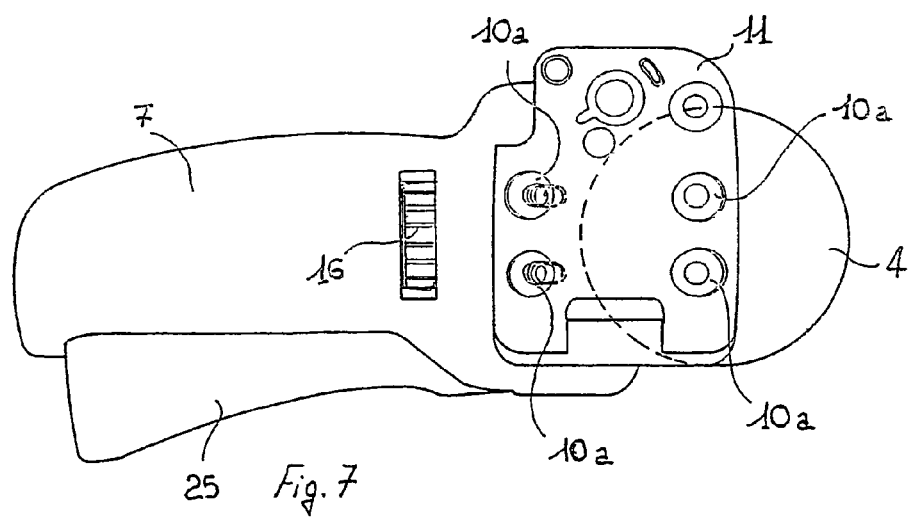
FIG. 7 is a plan view of the head of the preceding Figures.

In the drawings, 1 generally indicates a rapid-orientation head produced in accordance with the present invention. The head 1 comprises a ball joint 2 including a spherical member 3 mounted with threaded coupling at one end of a first attachment 4, for example of the type having a screw and a plate 5, with which the head 1 can be fixedly joined to a support, such as a photographic tripod.

The spherical member 3 is accommodated rotatably in a seat 6 defined at one end of a handle 7. A cup-shaped pressure member 8 is mounted in the seat 6 in order to lock the spherical member relative to the handle, as will be explained hereinafter.

On the handle 7, near the seat 6, is formed a collar 9 having opposing pairs of threaded holes 10a,b which are used to secure to the handle a second attachment 11, for example, of the type having a rapid-release plate (not shown). It will be noted that the axis of the handle 7, indicated by the section line II-II in FIG. 1, is inclined in such a manner as to diverge from the plane 13 of the second attachment, defined as the general securing plane of the equipment mounted thereon. This serves to increase the room for manoeuvre between the handle and the optical equipment mounted thereon when the handle is gripped by the user for the operations of orienting the head 1.

The provision of opposing holes 10a,b on the collar 9 in order to secure the second attachment 11 enables the second attachment to be moved into two different securing positions relative to which the handle extends to the right or to the left, in order to permit the rapid adaptation thereof to right-handed persons and left-handed persons.

Figure 8:
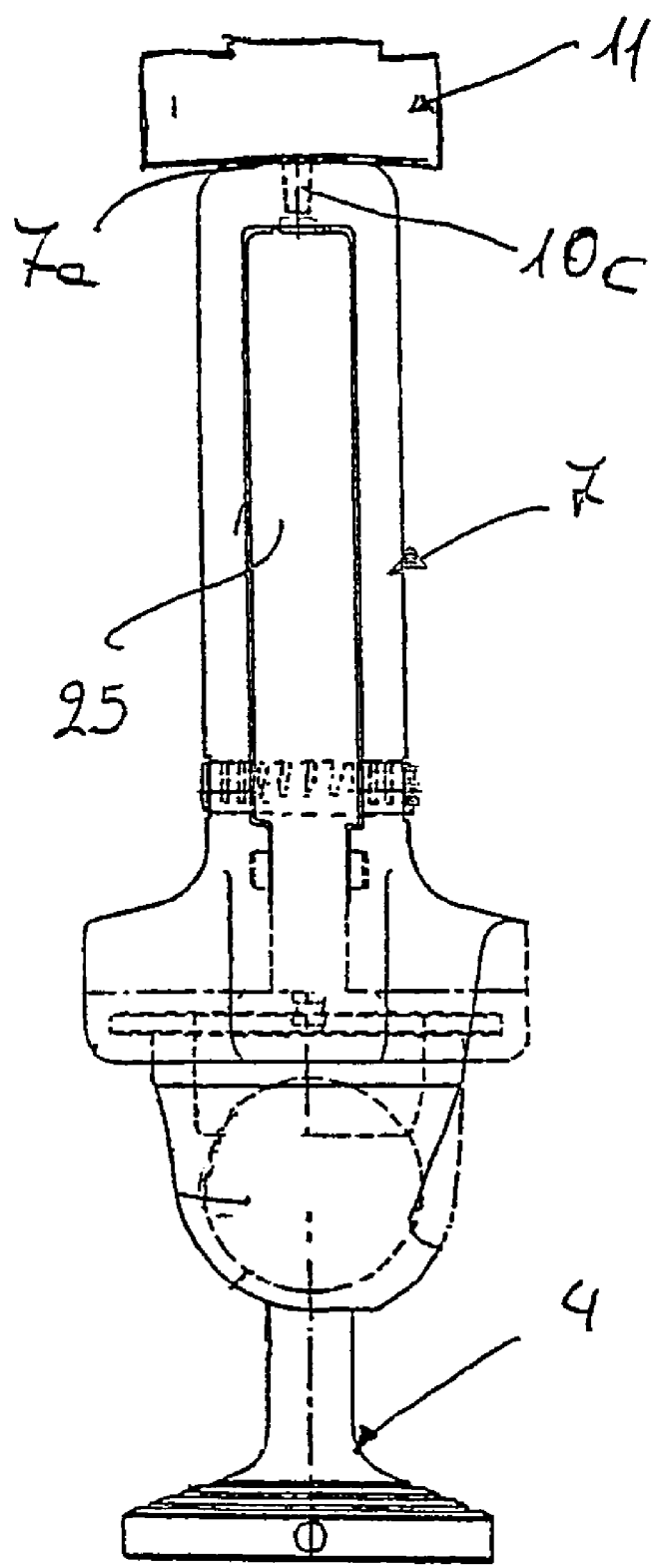
FIG. 8 is a front view of the head of FIG. 1 in a second operative configuration.

At the free end 7a of the handle 7, opposite to the collar 9, further threaded holes 10c, having an axis substantially parallel to the handle's axis, are provided. In this way the second attachment 11 may be moved also to a third securing position suitable for the use of the handle 7 in the vertical orientation, as illustrated in FIG. 8.

Preferably the free end 7a of the handle 7 is so shaped as to have a profile analogous to the collar 9. In this way, the second attachment 11 may be fixed without any intermediate adapting element.

The pressure member 8 is subjected to a double action. The first action is carried out by a spring 15 whose resilient load can be adjusted by means of a ring nut 16 keyed onto a threaded rod 17 on which a slider 18 is in screw engagement. The slider 18 is guided in such a manner that it cannot rotate by engagement of a fork 19 thereof in a guide 20 of the handle 7, so that, when the ring nut 16 is rotated, the resilient load transmitted to the pressure member by means of a strut 21 varies. This gives rise to an adjustable but constant resilient load on the pressure member which serves to brake the oscillation of the spherical member when otherwise unlocked, preventing or limiting the sudden oscillation thereof, which could damage the photographic equipment.

Also active on the pressure member 8 is the resilient load which is generated by a second spring 23 and which is exerted on the pressure member by means of a linkage, generally indicated 24, which keeps the ball joint normally locked.

The linkage 24 first of all comprises a first lever 25, for the manual unlocking of the ball joint, which lever is pivoted at 26 on the handle and is subjected to the action of the spring 23. The lever 25 acts on a second lever 27 which has an adjustable fulcrum on a grub screw 28 and points of application of the pressing and resisting forces on an end 29 thereof and in an intermediate portion 30 thereof, respectively. The lever 27 is traversed by a passage 31 for the strut 21 and has an added metal member 32 at the location of the end 29. The added member 32 is acted upon by a small cylinder 33 located on the first lever 25 at a predetermined distance from the fulcrum 26, so that when the lever 25 is operated the resilient load generated by the spring 23 is cancelled, freeing the ball joint 2.

Free orientation of the head 1 is thus permitted.

Figure 9:
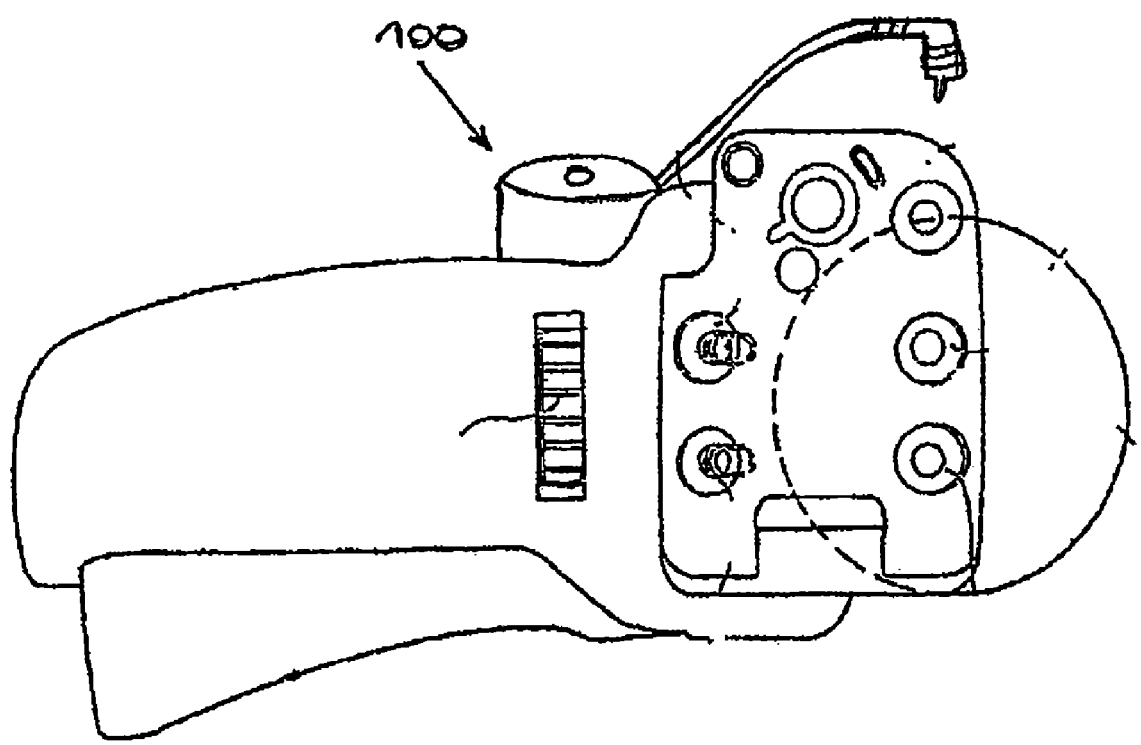
FIG. 9 is a plan view of the head of FIG. 7 including a remote control device.

It is also provided that the head 1 is equipped with a device 100 (best shown in FIG. 9) for the remote control of the release of a photographic apparatus mounted on the head 1. The device is preferably of the electromagnetic type.

The invention so designed offers a large number of advantages over traditional heads, including a substantial reduction in the distance between the first and the second attachment, with a consequent substantial reduction of the lever arm resulting therefrom, improved ease of handling of the head owing to its compactness and the simplified accessibility of the handle resulting from its inclination relative to the securing plane of the photographic equipment, and also the application of friction in the ball joint which, even in the unlocked stage, is not subject to sudden oscillation.

The invention claimed is:

1. A rapid-orientation head for optical and photographic apparatuses, comprising: a ball joint having first attachment means on one side, for attachment to a support, and having a handle on the other side, second attachment means on the handle for restraining the optical apparatus thereon, and reversible locking means for the ball joint which is mounted on the handle in order to permit relative orientation between the first and second attachment means, wherein the handle extends transversely with respect to the direction joining the first and second attachment means, and means are provided on the handle for securing the second attachment in opposing positions in order to enable the second attachment to be moved into two different securing positions relative to which the handle extends to the right or to the left, in order to permit the rapid adaptation thereof to right-handed persons and left-handed persons.

2. The rapid-orientation head according to claim 1, wherein a securing plane for the apparatus is defined on the second attachment means, the handle being inclined in such a manner that it diverges from the attachment plane relative to the perpendicular to the securing plane.

3. The rapid-orientation head according to claim 2, wherein the ball joint is of the type having a spherical member.

4. The rapid-orientation head according to claim 2, wherein auxiliary means are provided on a free end of the handle for securing the second attachment in order to enable the use of the handle in vertical position.

5. The rapid-orientation head according to claim 2, wherein a second resilient load acts on the pressure member in order to keep the ball joint normally locked.

6. The rapid-orientation head according to claim 2, wherein a device is provided for the remote control of the release of a photographic apparatus.

7. The rapid-orientation head according to claim 1, wherein the ball joint is of the type having a spherical member.

8. The rapid-orientation head according to claim 7, further comprising braking means for braking the oscillation of the spherical member when otherwise unlocked.

9. The rapid-orientation head according to claim 8, wherein the braking means comprises a pressure member acting on the spherical member owing to resilient preloading.

10. The rapid-orientation head according to claim 9, wherein the resilient preloading acting on the pressure member is adjustable.

11. The rapid-orientation head according to claim 7, wherein auxiliary means are provided on a free end of the handle for securing the second attachment in order to enable the use of the handle in vertical position.

12. The rapid-orientation head according to claim 7, wherein a second resilient load acts on the pressure member in order to keep the ball joint normally locked.

13. The rapid-orientation head according to claim 7, wherein a device is provided for the remote control of the release of a photographic apparatus.

14. The rapid-orientation head according to claim 1, wherein auxiliary means are provided on a free end of the handle for securing the second attachment in order to enable the use of the handle in vertical position.

15. The rapid-orientation head according to claim 1, wherein a second resilient load acts on the pressure member in order to keep the ball joint normally locked.

16. The rapid-orientation head according to claim 1, wherein a device is provided for the remote control of the release of a photographic apparatus.

17. The rapid-orientation head according to claim 16, wherein the device is of the electromagnetic type.

* * * * *